United States Patent
Saito et al.

(10) Patent No.: US 8,005,514 B2
(45) Date of Patent: Aug. 23, 2011

(54) FIELD DEVICE AND METHOD FOR TRANSFERRING THE FIELD DEVICE'S SIGNALS

(75) Inventors: Yoji Saito, Musashino (JP); Takashi Nishijima, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 1351 days.

(21) Appl. No.: 11/257,305

(22) Filed: Oct. 25, 2005

(65) Prior Publication Data

US 2006/0092039 A1    May 4, 2006

(30) Foreign Application Priority Data

Nov. 1, 2004 (JP) ................................. 2004-317593
Jul. 15, 2005 (JP) ................................. 2005-207648

(51) Int. Cl.
*H04B 1/38* (2006.01)
(52) U.S. Cl. ..... 455/572; 455/573; 455/574; 455/127.1; 455/343.1; 455/343.2
(58) Field of Classification Search ............... 455/572, 455/573, 574, 127.1, 343.1, 343.2; 340/870.01–870.44
See application file for complete search history.

(56) References Cited

U.S. PATENT DOCUMENTS

| | | | | |
|---|---|---|---|---|
| 6,690,182 B2 * | 2/2004 | Kelly et al. | ................ | 324/700 |
| 6,711,446 B2 * | 3/2004 | Kirkpatrick et al. | ............ | 700/19 |
| 7,010,294 B1 * | 3/2006 | Pyotsia et al. | ................ | 455/420 |
| 7,136,725 B1 * | 11/2006 | Paciorek et al. | ............... | 700/295 |
| 2003/0043052 A1 * | 3/2003 | Tapperson et al. | ....... | 340/825.37 |
| 2005/0017602 A1 * | 1/2005 | Arms et al. | .................... | 310/339 |
| 2005/0146220 A1 * | 7/2005 | Hamel et al. | .................... | 307/44 |
| 2005/0197803 A1 * | 9/2005 | Eryurek et al. | ............... | 702/185 |
| 2005/0235758 A1 * | 10/2005 | Kowal et al. | .............. | 73/861.29 |
| 2005/0242979 A1 * | 11/2005 | Hamilton et al. | ............. | 341/144 |

(Continued)

FOREIGN PATENT DOCUMENTS

JP    4-335796 A    11/1992
(Continued)

OTHER PUBLICATIONS

Chinese Office Action dated Sep. 14, 2010, issued in corresponding Chinese Patent Application No. 2005-207648.

*Primary Examiner* — Ajit Patel
*Assistant Examiner* — Khai M Nguyen
(74) *Attorney, Agent, or Firm* — Westerman, Hattori, Daniels & Adrian, LLP

(57) ABSTRACT

The present invention provides a field device whereby the device's additional information can be transmitted wirelessly without the need for battery replacement or external wiring. The present invention also provides a field device whereby the firmware of a wireless module in the field device can be developed at minimum cost and whereby it can be made easy to link the firmware to applications, such as an asset management system, on the host system side.

The field device in accordance with the present invention is installed in a plant, factory, or the like, connected to a higher-order distributed control system through a signal line, configured to input or output 4-20 mA signals, and comprised of:
an RF unit for transmitting or receiving radio signals; and
a power supply block for accumulating extra electric currents when the block is neither transmitting nor receiving radio signals;
wherein electric currents accumulated in the power supply block are supplied to the RF unit so as to be used as electric power for transmitting or receiving radio signals.

15 Claims, 11 Drawing Sheets

U.S. PATENT DOCUMENTS

2005/0245291 A1 * 11/2005 Brown et al. .................. 455/572

FOREIGN PATENT DOCUMENTS

| JP | 8-125767 A | 5/1996 |
| JP | 2003-051894 * | 2/2003 |
| JP | 2003-51894 | 2/2003 |
| JP | 2003-134261 | 5/2003 |
| JP | 2004-21877 | 1/2004 |
| WO | 01/51836 A1 | 7/2001 |

* cited by examiner

| Delimiter | Address | [Expansion bytes] | Command | Byte count | [ Data ] | Check byte |
|---|---|---|---|---|---|---|
| | | | | | | |

FIELD DEVICE AND METHOD FOR TRANSFERRING THE FIELD DEVICE'S SIGNALS

BACKGROUND OF THE INVENTION

1. Field of the Invention

The present invention relates to a field device, such as pressure and differential pressure transmitters, flowmeters, thermometers, and valve positioners, that are arranged in a plant in a decentralized manner. More specifically, the invention relates to the improvement of a field device and a signal transfer method for wirelessly transmitting additional information, including diagnostic information held by the field device, to a system that controls the field device.

2. Description of the Prior Art

In general, field devices are arranged at the location of petrochemical, food, pharmaceutical, water supply/sewerage, iron-making, or other process piping; where they detect physical quantities, including temperature, pressure and flow rate inside the piping; and transmit the detected signals to control equipment installed at a distant location or receive signals transmitted from the control equipment. Such field devices include pressure and differential pressure transmitters, flowmeters, thermometers and valve positioners.

There are prior art documents related to these field devices (see patent documents 1 to 3, for example, mentioned later in this section).

FIG. 11 is a conceptual block diagram of a valve positioner (hereinafter simply referred to as 'positioner') that is conceived according to the descriptions provided in the aforementioned patent documents. Positioner 10 receives a 4-20 mA current signal at signal input block 11 and measures the position sensor signal Position received by sensor signal input block 13 at signal processing circuit 12, wherein signal processing circuit 12 outputs a manipulation signal to valve actuating block 14, so that valve 20 is placed in a position corresponding to the received 4-20 mA current signal.

Most of the positioners known as smart-type positioners contain a pressure sensor (not shown in the figure) for measuring the manipulation pressure applied to valve 20. The pressure signal Pressure of the pressure sensor is input to sensor signal input block 13 and is processed appropriately by signal processing circuit 12 so that the manipulation pressure can be monitored. In addition to monitoring the manipulation pressure, the positioner makes it possible to diagnose valve 20 from various aspects, including the valve position.

The position sensor and pressure sensor signals or the results of valve diagnosis are transmitted from smart signal transmitter/receiver block 15 to a host system by means of so-called smart communication. Smart communication refers to digital communication in which digital signals are superimposed on 4-20 mA analog signals, and is also called hybrid communication. Methods of smart communication in practical use include HART, Brain and DE.

The host system may be a handheld communicator (HHC) or an asset management system.

As field devices have become increasingly intelligent recently, there has been a growing demand to optimize equipment maintenance costs by transmitting a variety of process operation information and diagnostic information to an asset management system.

However, existing distributed control systems (DCS) have the following problems:

In some cases, it is difficult to connect the latest asset management system to an existing DCS. Under normal conditions, a multiplexer is added in order to connect a digital communication line from the asset management system to each individual positioner. Communication may not be possible, however, due to low impedance in the communication band of an I/O card's 4-20 mA loop.

In this case, a filter is inserted in series with the 4-20 mA loop in order to increase the impedance in the communication band.

In spite of this measure, the voltage that can be output on the DCS side may be exceeded for reasons of voltage drops.

Wireless transmission is a method of digital signal transfer free from such problems. A number of techniques for adding a wireless module to a field device to make this transfer feasible have already been proposed.

By adding a wireless module to a field device instrumented using the existing 4-20 mA signal interface, it is possible to transmit a variety of process operation information and diagnostic information on field devices to the asset management system. FIG. 12 is a block diagram illustrating one example of a positioner configured in the manner described above, wherein RF unit 16 is a wireless module.

Patent document 1: Japanese Laid-open Patent Application 2003-134261

Patent document 2: Japanese Laid-open Patent Application 2003-051894

Patent document 3: Japanese Laid-open Patent Application 2004-021877

Patent document 4: Japanese National Publication of Patent Application 1998-508129

Patent document 5: Japanese Patent 3635982

SUMMARY OF THE INVENTION

However, the positioner equipped with the wireless module has the following problems from the viewpoint of the electric power required for transmitting or receiving radio signals: As a power supply for the wireless module, either power supply block 17 using batteries or an external power supply needs to be used. Hence, the problem is that the former requires battery replacement whereas the latter necessitates additional wiring.

The present invention is intended to solve the foregoing problems. An object of the invention, therefore, is to provide a field device whereby the device's additional information can be transmitted wirelessly without the need for battery replacement or external wiring.

Another object of the present invention is to enable the firmware of a wireless module in the field device to be developed at minimum cost and to provide a method for transferring the field device's signals whereby it can be made easy to link the firmware to applications, such as an asset management system, on the host system side.

DETAILED DESCRIPTION OF THE PREFERRED EMBODIMENTS

Figure 1:
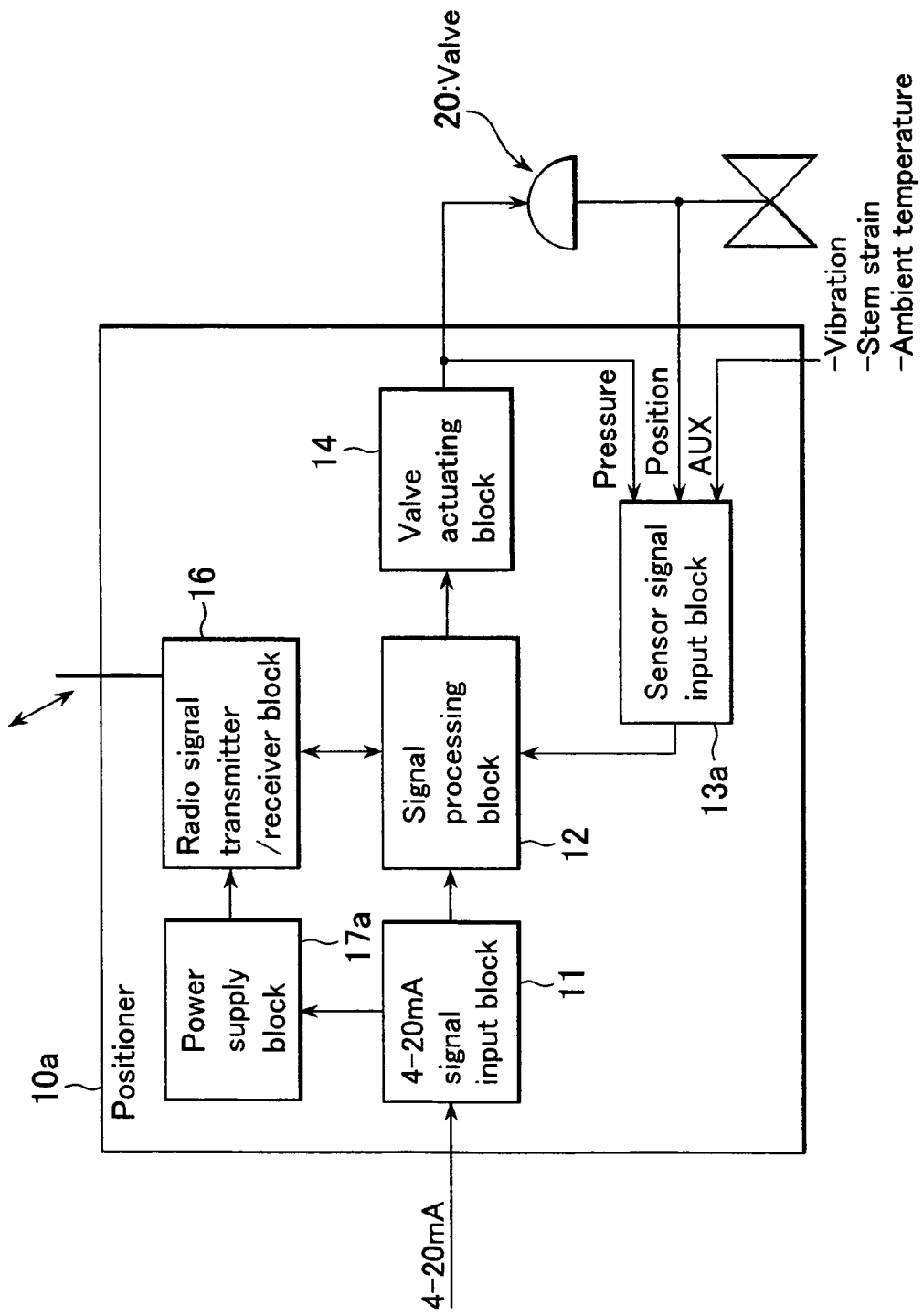
FIG. 1 is a basic block diagram illustrating a first embodiment of the positioner in accordance with the present invention.

The field device in accordance with the present invention, in which the aforementioned objects are achieved, is as follows:

A field device installed in a plant, factory, or the like, connected to a higher-order distributed control system through a signal line, and configured to input or output 4-20 mA signals, comprising:
 an RF unit for transmitting or receiving radio signals; and
 a power supply block for accumulating extra electric currents when the block is neither transmitting nor receiving radio signals;
wherein electric power accumulated in the power supply block are supplied to the RF unit so as to be used as electric power for transmitting or receiving radio signals.

According to the system configuration described above, it is possible to accumulate extra electric currents of a 4-20 mA loop in the power supply block and to use the electric power to transmit or receive signals at the RF unit. Consequently, the field device requires neither battery replacement, which is otherwise necessary when batteries are used, nor the use of any external power supply.

Another advantage is that the higher-order DCS can be connected to and used with the field device in the same way as before since the 4-20 mA signal is still utilized, and the control stability and reliability remain the same as before because the 4-20 mA signal rather than a radio signal is used for the control loop.

In this case, the RF unit is configured to operate so as to minimize the current consumption thereof when not transmitting or receiving signals.

Yet another advantage is that the RF unit is configured to be able to exchange data with an asset management system, with a handheld data terminal, and with another field device.

Yet another advantage is that the field device is configured so that the power supply block accumulates extra electric currents received from the 4-20 mA signal in a storage battery or a capacitor.

Yet another advantage is that the asset management system monitors and diagnoses the field device according to information sent therefrom.

Yet another advantage is that data transmitted from the RF unit is a major process variable, an auxiliary process variable, diagnostic information or device operation information, or a plurality of these data items.

Yet another advantage is that the field device is configured so that additional sensor signals can be externally input to the field device.

Yet another advantage is that the RF unit and the power supply block have modular configurations whereby these blocks can be removed in part or in whole.

Yet another advantage is that in the present invention, a valve positioner can be adopted as the field device.

The method for transferring the field device's signals in accordance with the present invention is as follows:

In a field device installed in a plant, factory, or the like, connected to a higher-order distributed control system through a signal line, configured to input or output 4-20 mA signals, and comprised of an RF unit connected to a signal processing circuit to transmit or receive data using radio signals, a method for transferring signals of the field device wherein data is wirelessly transmitted from the RF unit using the upper layers of the digital communication protocol used for 4-20 mA field devices. At this point, the upper layers refer to the data link layer, application layer, or other layers, except for the physical layer of the protocol.

According to the signal transfer method described above, it is possible for any existing 4-20 mA smart-type field device to exchange signals with the RF unit without having to change the firmware of the field device's signal processing circuit or by changing only part of the firmware. Another advantage is that the firmware of RF unit 16 is independent of field devices and is, therefore, simple, because it suffices to simply transfer the upper layer parameters of the smart communication protocol. In addition, the firmware can be shared among field devices. Yet another advantage is that it is possible for the field device, in accordance with the present invention, to communicate with wireless-enabled devices by only minimally changing the software module of the existing asset management system without having to change the software configuration thereof.

In the signal transfer method described above, unmodulated logical signals are used to physically exchange signals between the signal processing circuit and the RF unit.

Another characteristic feature is that the upper layer of the communication protocol used between the signal processing circuit and the RF unit is the data link layer or application layer of the digital communication protocol used for 4-20 mA devices, or a combination thereof.

Yet another characteristic feature is that the digital communication protocol whose upper layers are used, is HART.

The present invention is described in further detail below:
(A) A field device configured to input or output analog signals through a signal line, comprising:
 a charge control means for calculating a correlation between the electric current of the signal line and the current consumption of internal circuitry involved in the processing of the analog signals;
 a charging circuit for generating specific electric currents or voltages necessary for charging according to signals from the charge control means, using part of the electric current of the signal line;
 an electric storage device to be charged by the charging circuit;
 a state-of-charge detection means for detecting a degree to which the electric storage device is charged; and
 an RF unit which is supplied with power from the electric storage device and is enabled or disabled according to the output of the state-of-charge detection means.
(B) The field device of item (A), wherein the charge control means and the signal processing circuit involved in the processing of the analog signals are integrally formed into a microprocessor.

(C) The field device of item (A), further comprising:
a first supply voltage generation means which is connected to the signal line and is also connected in parallel with the series-connected charging circuit and electric storage device; and
a second supply voltage generation means which is connected in series with the first supply voltage generation means and generates voltages to be supplied to the internal circuitry.
(D) The field device of item (A), wherein the charge control means controls the charging circuit so that the electric current of the first supply voltage generation means is set to a prescribed value.

As described above, the following advantageous effects are achieved according to the present invention:

According to the present invention of the field device:
(1) The existing DCS can be used with the field device in the same way as before since the 4-20 mA signal is still utilized, and the control stability and reliability remain the same as before since the 4-20 mA signal rather than a radio signal is used for the control loop.
(2) The system utilizes extra electric currents in the 4-20 mA loop. The electric currents are accumulated in a battery and reused as electric power for transmitting or receiving signals, thereby eliminating the need for battery replacement or any external power supply input.
(3) In wireless communication, the positioner mainly sends the data necessary for diagnosis so that the data is handled by the asset management system. Consequently, reductions in maintenance costs can be expected. In addition, by using a wireless-enabled handheld communicator, it is possible to communicate with and configure field devices without having to connect to any hard-wired lines. Consequently, reductions in maintenance costs can be achieved.

Also according to the method for transferring the signals of the field device:
(1) It is possible for any existing 4-20 mA smart-type field device to exchange signals between the RF unit thereof and a host system without having to change the firmware of the field device's signal processing circuit or by changing only part of the firmware.
(2) The firmware of RF unit 16 is independent of field devices and is, therefore, simple, because it suffices to simply transfer the upper-layer parameters of the smart communication protocol. In addition, the firmware can be shared among field devices.
(3) It is possible for the field device, in accordance with the present invention, to communicate with wireless-enabled devices by only minimally changing the software module of the existing asset management system without having to change the software configuration thereof.

Figure 12:
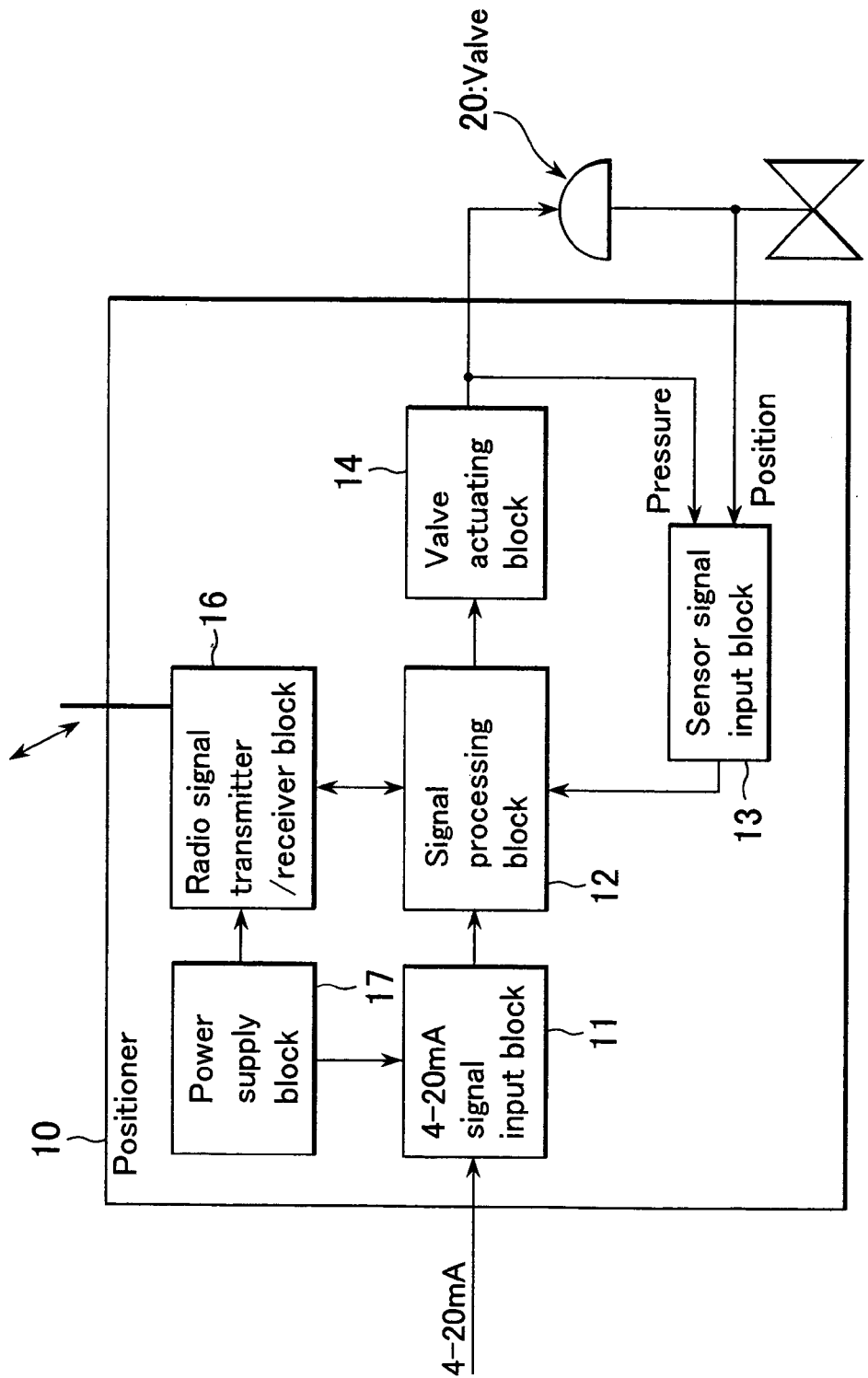
FIG. 12 is a block diagram illustrating one example of the positioner.

The present invention will hereinafter be described in detail with reference to the accompanying drawings, wherein a positioner, which is a field device, is taken as an example. FIG. 1 is a basic block diagram illustrating one embodiment of the positioner in accordance with the present invention. Positioner 10a is distinguished from the positioner shown in FIG. 12 by the fact that positioner 10a comprises power supply block 17a and sensor signal input block 13a.

Power supply block 17a receives power from 4-20 mA signal input block 11. The power supply block is previously designed so that the minimum current consumption (also referred to as static current consumption) thereof is smaller than 4 mA, for example, below 3.6 mA, when the block is neither transmitting nor receiving radio signals. Assuming that the field device's static current consumption is 3.2 mA and the minimum input current from the DCS is 3.6 mA, then the minimum extra electric current of 0.4 mA is available in any circumstances. Power supply block 17a is configured so as to accumulate the extra electric current in a rechargeable battery, large-capacitance capacitor, or the like built thereinto, and draws the electric current therefrom when transmitting or receiving radio signals, in order to supply the electric current to RF unit 16 so that the electric current is used as electric power.

With a focus on diagnosis, sensor signal input block 13a is configured so as to receive the externally-input sensor signal AUX, such as a vibration, strain or ambient temperature signal, in addition to the conventional valve opening and manipulation pressure (Position and Pressure) signals, and to pass the signal to signal processing circuit 12 to enable such vibration, strain or temperature to be measured.

Currently, the standard IEEE802.15.4 is available as a wireless protocol that assumes the deployment of a network of field devices. This standard specifies the transmission rate as 250 kbps. Assuming that the number of bytes, in which the diagnostic information of the valve positioner is sent at a time, is 100 bytes, then such a transmission would take 3.2 msec (=1/250 kbps×8×100). To make this easier to understand, let us assume an application wherein diagnostic information is regularly transmitted once every 5 seconds. In that case, only 0.06% (=3.2/5000×100) of the entire amount of that time has to be used for transmission.

Let us further assume that the current consumption is 100 mA at the time when RF unit 16 is transmitting signals, and is almost 0 mA during the rest of the time when the block is made to sleep. In this case, an extra electric current of at least 0.06 mA (=100 mA×0.06/100) suffices, proving that the minimum extra electric current of 0.4 mA mentioned earlier is of an adequate level for practical use.

It should be noted that RF unit 16 is configured so as to also be able to exchange data with handheld data terminals or other field devices.

Also note, that data transmitted from RF unit 16 includes a process variable, an auxiliary process variable, and device operation information, in addition to the diagnostic information; and the block is designed to be able to transmit any one of these data items or a plurality thereof, as necessary.

In addition, the RF unit and the power supply block have modular configurations whereby these blocks can be removed in part or in whole.

Figure 2:
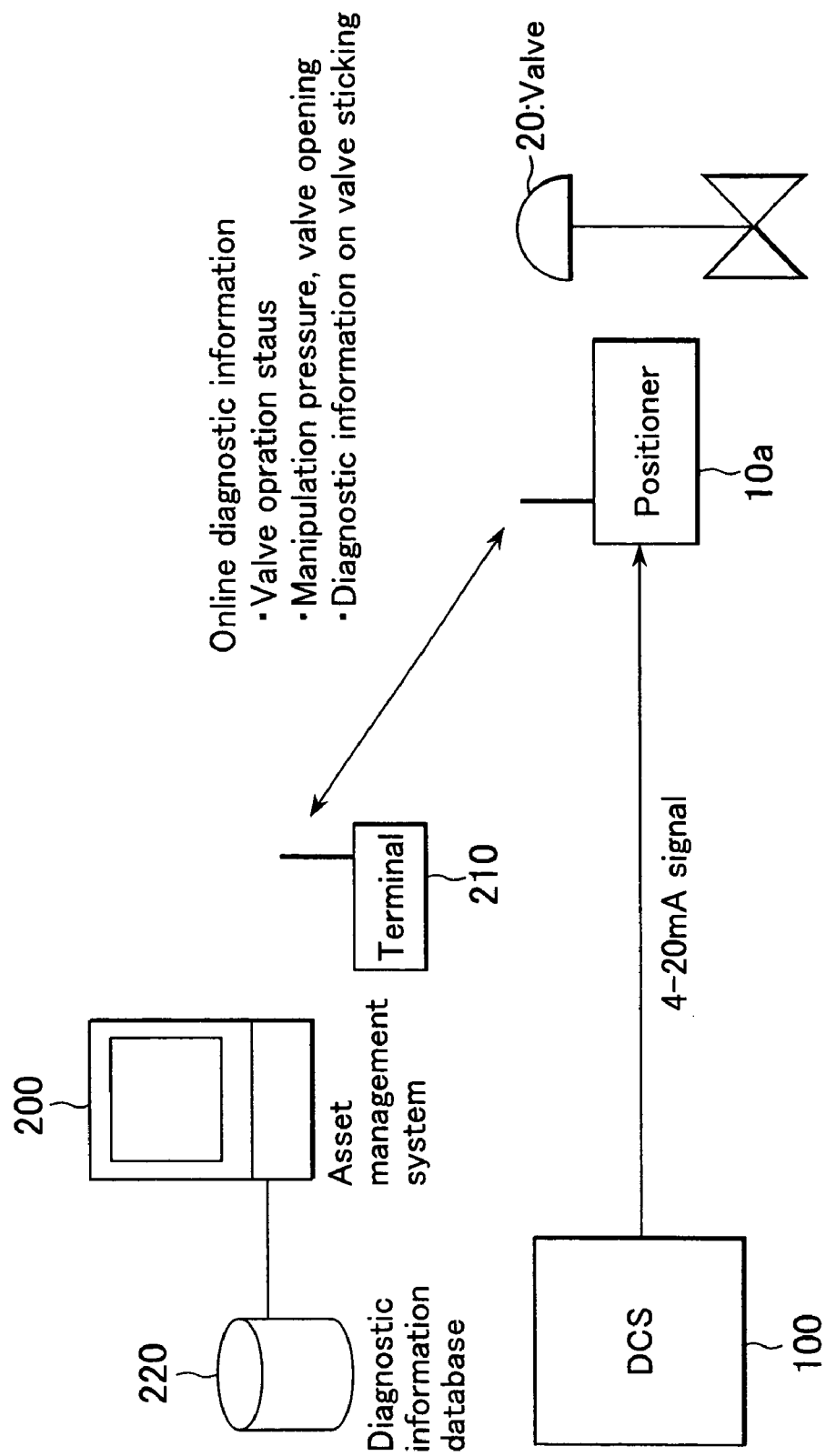
FIG. 2 is a schematic view illustrating one embodiment of the system configuration when the positioner shown in FIG. 1 is used.

FIG. 2 is a schematic view illustrating one embodiment of the system configuration when the positioner shown in FIG. 1 is used. Although it is assumed that there are plural pairs of valve 20 and positioner 10a, only one pair is shown in the figure. In the figure, numeral 100 denotes an existing DCS100 that provides a 4-20 mA signal to positioner 10a. Numeral 200 denotes an asset management system. Numeral 210 denotes a terminal used to communicate wirelessly with positioner 10a and is connected to asset management system 200. Numeral 220 is a diagnostic information database that stores diagnostic information and can be accessed from asset management system 200.

From positioner 10a, process operation information, valve diagnostic information and other information are transmitted to asset management system 200. More specifically, positioner 10a transmits the following contents, for example:
(1) Valve operating conditions, including the valve open time, valve closure time, and stroke frequency
(2) Manipulation pressure, valve opening (position), and external sensor input signal
(3) Valve diagnostic information, including sticking According to the system configuration described above, it is possible to continue to use the existing DCS as it is, since the 4-20 mA signal input is still utilized. Another advantage is that since the control loop uses a 4-20 mA signal rather than a radio signal, control stability and reliability remain the same as before.

Yet another advantage is that the system utilizes extra electric currents in the 4-20 mA loop. The electric currents are accumulated in a battery and reused as electric power for transmitting or receiving signals, thereby eliminating the need for battery replacement or any external power supply input.

Yet another advantage is that in wireless communication, the positioner mainly sends the data necessary for diagnosis so that the data is handled by the asset management system. Consequently, reductions in maintenance costs can be expected.

In the above-described embodiment, an explanation has been made specifically for an example of the valve positioner wherein a 4-20 mA signal is input from the DCS. However, the present invention can also be applied to sensors, such as a differential pressure transmitter, temperature transmitter and flowmeter, that output a 4-20 mA signal to the DCS.

Figure 3:
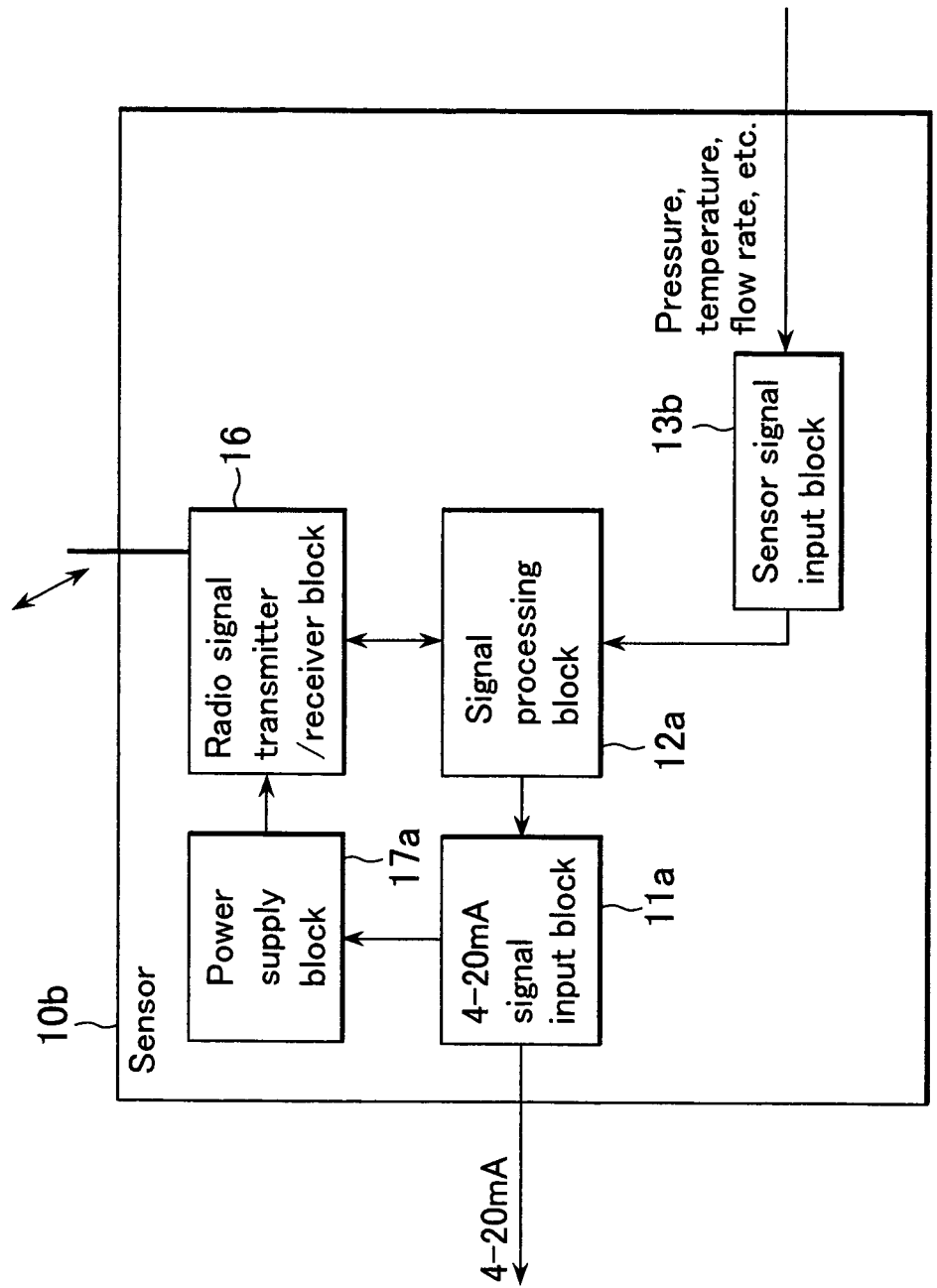
FIG. 3 is a block diagram illustrating one example of a sensor.

FIG. 3 is a block diagram illustrating one example of such a sensor as described above. Sensor 10b is configured so as to be externally provided with a supply voltage of, for example, 24 V, and to output electric currents appropriate for pressure, temperature, flow rate or other sensor signals.

In the figure, RF unit 16 and power supply block 17a are equivalent to those shown in FIG. 1. Signal processing circuit 12a measures a sensor signal received by sensor signal input block 13b and transmits a value corresponding to the sensor signal to the DCS through 4-20 mA signal input block 11a. If the electric current consumed within sensor 10b has a margin against the output current (3.6 mA or larger under normal conditions), the margin serves as an extra electric current and is accumulated in power supply block 17a.

Next, a method for transferring the signals of the field device in accordance with the present invention will be described hereinafter. In the present invention, a wireless module is added to exchange digital signals with the signal processing circuit. On the other hand, logical conversion into a wireless protocol is required and, therefore, it is necessary to design the firmware of the RF unit according to the functional specifications of the field device.

For example, when developing a common wireless module equipped with both a power supply block and an RF unit, it is necessary to perform protocol conversion on the logical format of a digital signal coming in from the signal processing circuit at the RF unit before transmitting the digital signal, since the functional specifications of field devices differ from one field device to another.

The field device described in this embodiment is designed to enable the firmware of the wireless module to be developed at the minimum development cost and to make it easy to link the firmware with applications running on the host system, such as an asset management system.

Next, the signal transfer methods in accordance with the present invention will be described hereinafter, wherein in the field device shown in FIG. 1 or 3, the methods can transmit signals in the manner explained below:

(1) From a logical viewpoint, a so-called smart communication protocol is used for signal exchange between signal processing circuit 12 and RF unit 16.

Smart communication protocols, either manufacturer-specific or standardized by international standardization groups, include HART, Brain and DE, the physical layers of which differ from one another. For example, HART adopts a frequency modulation method known as FSK. In the present invention, the interface between signal processing circuit 12 and RF unit 16 is assumed to be at a commonly used logic level (signal that represents "on" and "off" states using a 0-3 V or 0-5 V range, and is also known as NRZ).

Figures 4, 5:
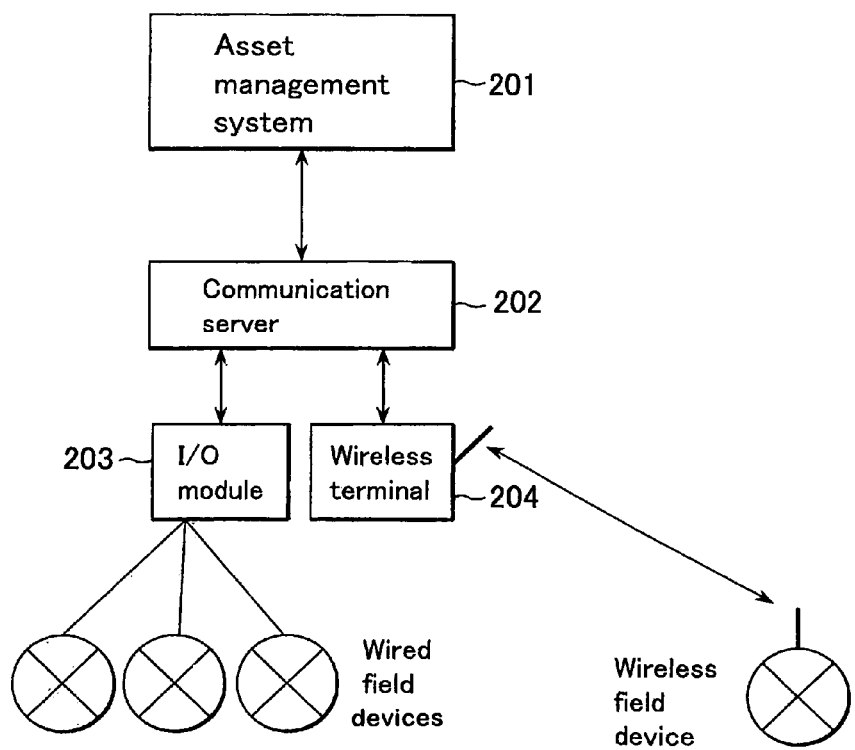
FIG. 4 is a schematic view illustrating the frame format of the HART protocol.
FIG. 5 is a schematic view illustrating one example of the configuration of an asset management system.

(2) For communication between RF unit 16 and the host system, data based on an upper layer of the HART protocol is exchanged. FIG. 4 is a schematic view illustrating the frame format of the HART protocol. While the frame format includes data link layer and user layer parameters, only the user layer parameters (command, byte count and data) or the user layer parameters and part of the data link layer parameters are exchanged for communication between RF unit 16 and the host system.

In other words, a frame for smart communication is used for the data of upper layers included in the wireless protocol. As examples of the wireless protocol, there are wireless communications standards (for example, IEEE802.15.4) that assume the deployment of a network of field devices.

Next, the host system will be described hereinafter. FIG. 5 is a schematic view illustrating one example of the configuration of an asset management system. For example, the industry-standard OPC interface is employed as an interface between the software of asset management system 201's main unit and the software of communication server 202. Communication server 202 is responsible for access to hardware, such as I/O module 203 and wireless terminal 210.

Let us assume that the method for communication with wired field devices is HART and the data of upper-layer protocols for communication with wireless field devices is also in the HART format. Then, the OPC (communication server) data format as viewed from the asset management system is completely the same. Consequently, the asset management system can deal with both wired and wireless field devices without distinction.

In the case of HART, DD (Device Description) is supported by the HART Communication Foundation (HCF), and device attributes and menu structures for parameter access are defined. These features can also be applied to wireless field devices, as with wired field devices.

According to the signal transfer methods described above, the following advantageous effects are achieved:

(1) It is possible for any existing 4-20 mA smart-type field device to exchange signals with the RF unit without having to change the firmware of the field device's signal processing circuit or by changing only part of the firmware.

(2) The firmware of RF unit 16 is independent of field devices and is, therefore, simple, because it suffices to simply transfer the upper-layer parameters of the smart communication protocol. In addition, the firmware can be shared among field devices.

(3) It is possible for the field device, in accordance with the present invention, to communicate with wireless-enabled devices by only minimally changing the software module of the existing asset management system without having to change the software configuration thereof.

Figure 6:
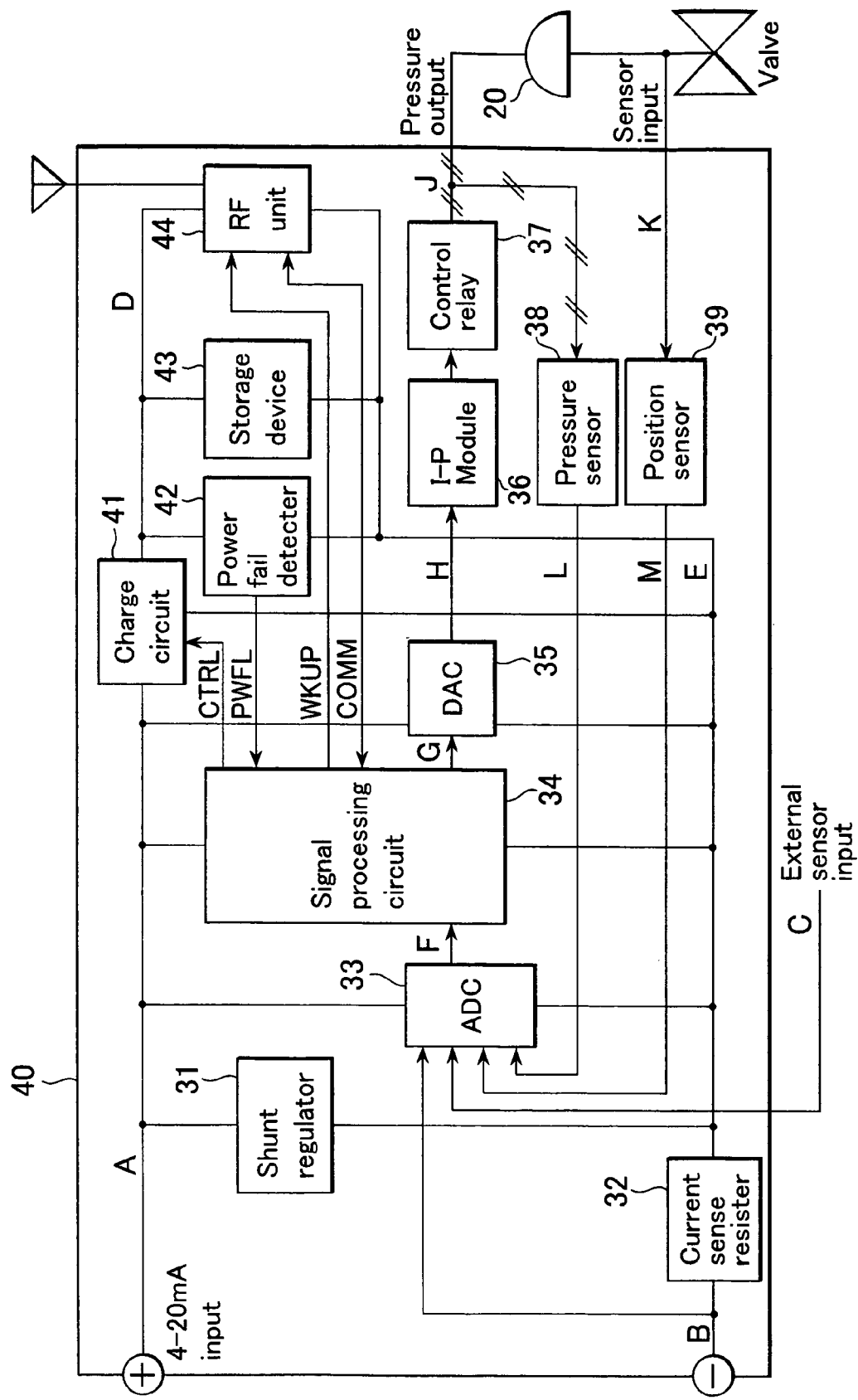
FIG. 6 is a block diagram illustrating a second embodiment of the positioner in accordance with the present invention.

The present invention will hereinafter be described in detail with reference to FIG. 6. FIG. 6 is a block diagram illustrating a second embodiment in accordance with the present invention. Note that elements identical to those of FIG. 1 are referenced alike and excluded from the explanation.

The embodiment illustrated in FIG. 6 is characteristic in that charging circuit 41 and electric storage device 43 are used to configure the circuit. This embodiment is of valve positioner 40 (field device), and connection points A and B are connected to a signal line (not shown in the figure) through which a 4-20 mA signal (analog signal) is input.

One end of shunt regulator 31 (supply voltage generation means) is connected to connection point A and one end of current-sensing resistor 32 is connected to connection point B. In addition, the other ends of shunt regulator 31 and current-sensing resistor 32 are connected to each other at connection point E. Then, connection point E is defined as the common potential point of field device 40. From a 4-20 mA input current flowing into connection point A, shunt regulator 31 generates a supply voltage for internal circuits, such as A/D converter (ADC) 33, signal processing circuit 34 and D/A converter (DAC) 35, involved in the processing of 4-20 mA signals.

ADC 33 is connected to connection points A and E, through which power is supplied to the converter. In addition, a signal at connection point B, signal C from an external sensor input, signal L, and signal M are input to ADC 33.

Signal processing circuit 34 is connected to connection points A and E, through which power is supplied to the block. In addition, signal F output from ADC 33 and signal PWFL are input to signal processing circuit 34, and signal COMM is input to and output from the block. Signal processing circuit 34 is comprised, for example, of a microprocessor (not shown in the figure) and memory (not shown in the figure). Programs and data are stored in the memory.

Signal processing circuit 34 also functions as a charge control means for calculating a correlation between the electric current of the signal line and the current consumption of internal circuitry. Signals CTRL, PWFL, WKUP and COMM are input to and output from signal processing circuit 34.

DAC 35 is connected to connection points A and E, through which power is supplied to the converter. In addition, signal G output from signal processing circuit 34 is input to DAC 35.

Signal H output from DAC 35 is input to I-P module 36, and the output of I-P module 36 is input to control relay 37. I-P module 36 converts electric signals into pneumatic signals. Control relay 37 amplifies this pneumatic signal and outputs air pressure to valve 20.

Pressure signal J output from control relay 37 is input to pressure sensor 38 and valve 20. Pressure sensor 38 outputs signal L.

Position signal K from valve 20 is input to position sensor 39 by mechanical, magnetic or other alternative means. Position sensor 39 outputs signal M.

Charging circuit 41 is connected to connection points A and E and is further connected to connection point D. Signal CTRL output from signal processing circuit 34 is input to charging circuit 41. From part of the electric current (current of the signal line) flowing into connection point A, charging circuit 41 generates an electric current or voltage for connection point D and charges electric storage device 43 in the subsequent stage.

Power failure detector (state-of-charge detection means) 42 is connected to connection points D and E. Power failure detector 42 outputs voltage monitoring signal PWFL to signal processing circuit 34, and notifies signal processing circuit 34 to what degree electric storage device 43 is charged or discharged.

Electric storage device 43 is connected to connection points D and E. That is, charging circuit 41 and electric storage device 43 form a series circuit. Electric storage device 43 is formed using, for example, a rechargeable battery or a large-capacitance capacitor. Electric storage device 43 is charged by charging circuit 41.

RF unit 44 is connected to connection points D and E, through which power is supplied to the block. Signal WKUP output from signal processing circuit 34 is input to RF unit 44, and signal COMM is input to and output from the transmitter/receiver block. RF unit 44 is enabled or disabled according to signal WKUP and performs serial communication based, for example, on start-stop synchronization, with signal processing circuit 34, using signal COMM.

Now the behavior of the valve positioner discussed above will be explained according to the embodiment illustrated in FIG. 6.

Valve positioner 40 receives a 4-20 mA current as an input current and generates a supply voltage for an internal circuit using shunt regulator 31. The input current is converted into an analog voltage signal by current-sensing resistor 32 and is further converted into a digital value by ADC 33. The signal of position sensor 39 is also converted into a digital value by ADC 33.

Signal processing circuit 34 performs, for example, PID control computations according to the input current signal and the signal from a position sensor and controls I-P module 36 through DAC 35 so that a valve position corresponding to the input current is obtained. I-P module 36 converts electric signals into pneumatic signals, and control relay 37 amplifies this pneumatic signal to control valve 20. Thus, valve positioner 40 controls valve 20.

It should be noted that the embodiment illustrated in FIG. 6 may also monitor the pressure of valve 20 or diagnose valve 20 or external environments. The embodiment illustrated in FIG. 6 may also engage in hybrid communication through a 4-20 mA line (for example, modulation and demodulation for the HART communication standardized by the HART Communication Foundation).

Signal processing circuit 34 of the embodiment illustrated in FIG. 6 performs pulse-width modulation on signal CTRL according to the value of the 4-20 mA input current, for example, to control the voltage and electric current generated by charging circuit 41.

More specifically, signal processing circuit 34 controls the voltage and electric current so that an extra electric current obtained by subtracting the electric current consumed at ADC 33, signal processing circuit 34, DAC 35 and other internal circuits from the 4-20 mA input current (electric current of the signal line) flows through charging circuit 41.

When electric storage device 43 is fully charged, power failure detector 42 changes signal PWFL and notifies such a change to signal processing circuit 34.

When electric storage device 43 is fully charged and wireless transmission or reception needs to be carried out, signal processing circuit 34 enables RF unit 44 using signal WKUP. In other words, the embodiment illustrated in FIG. 6 is configured so that the valve positioner intermittently enables RF unit 44 while securing a sufficient amount of electric power for the transmitter/receiver block according to the output of power failure detector 42.

Signal processing circuit 34 and RF unit 44 communicate with each other bilaterally using signal COMM when RF unit 44 is active.

If electric storage device 43 becomes excessively discharged, power failure detector 42 changes signal PWFL and notifies such a change to signal processing circuit 34.

If electric storage device 43 becomes excessively discharged as discussed above, signal processing circuit 34 disables RF unit 44 using signal WKUP.

As described above, the valve positioner of the embodiment illustrated in FIG. 6 efficiently charges electric storage device 43. This means that the valve positioner of the embodiment illustrated in FIG. 6 effectively charges electric storage device 43 with an extra electric current. In addition, the valve positioner of the embodiment illustrated in FIG. 6 efficiently enables RF unit 44. Consequently, the embodiment illustrated in FIG. 6 provides a highly efficient, small, low-cost valve positioner. Another advantage of the embodiment illustrated in FIG. 6 is that the valve positioner can be conveniently configured using electronic parts and the like that are easily available on the market. Yet another advantage of the embodiment illustrated in FIG. 6 is that the valve positioner can communicate appropriately with an external host system, asset management system, or the like.

Yet another advantage is that RF unit 44 can be operated in a stable manner by optimizing the electric current to be charged into electric storage device 43 from the extra electric current, according to the input current. Yet another advantage is that wireless transmission and reception can be carried out in a highly reliable manner by detecting that electric storage device 43 is charged to an adequate voltage level and intermittently enabling RF unit 44 to send and receive data.

Yet another advantage of the embodiment illustrated in FIG. 6 is that any existing DCS can be used as it is since the existing 4-20 mA signal line is still utilized. Yet another advantage is that control stability and reliability are ensured since a 4-20 mA signal line rather than a wireless link is used for control loops. Yet another advantage is that the system utilizes extra electric currents in the 4-20 mA loop. The electric currents are stored in a battery and reused as electric power for transmitting or receiving signals, thereby eliminating the need for battery replacement or any external power supply input. Yet another advantage is that in wireless communication, the positioner mainly sends the data necessary for diagnosis so that the data is handled by the asset management system. Consequently, reductions in maintenance costs can be expected.

Figure 7:
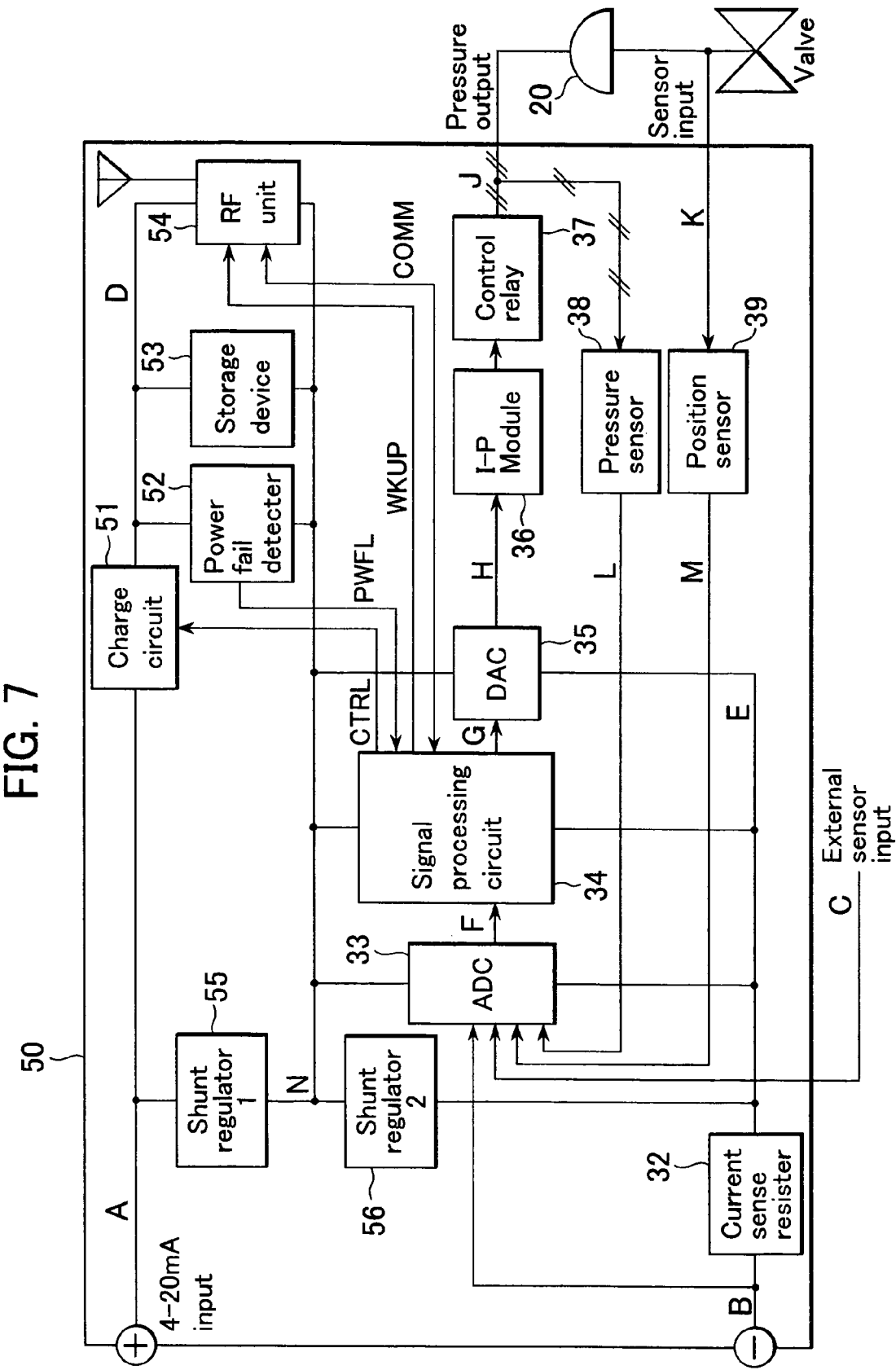
FIG. 7 is a block diagram illustrating a third embodiment of the positioner in accordance with the present invention.

The present invention will hereinafter be described in detail with reference to FIG. 7. FIG. 7 is a block diagram illustrating a third embodiment of the valve positioner in accordance with the present invention. Note that elements identical to those shown in FIG. 6 are referenced alike and excluded from the explanation.

The embodiment (valve positioner 50) illustrated in FIG. 7 is characteristic in that like the embodiment illustrated in FIG. 6, charging circuit 51 and electric storage device 53 are used to configure the valve positioner. The embodiment illustrated in FIG. 7 is also characteristic in that the valve positioner is equipped with first shunt regulator (supply voltage generation means) 55 and second shunt regulator 56.

One end of first shunt regulator 55 is connected to connection point A. The other end of first shunt regulator 55 is connected to one end of second shunt regulator 56 at connection point N. In addition, the other end of second shunt regulator 56 is connected to connection point E (the other end of current-sensing resistor 32).

Connection points E and N are defined as the common potential points of valve positioner 50. Connection point N is connected to internal circuits, such as analog-to-digital converter (ADC) 33, signal processing circuit 34, and digital-to-analog converter (DAC) 35.

This means that first shunt regulator 55 is connected to the signal line, and is also connected in parallel with the series circuit of charging circuit 51 and electric storage device 53. Second shunt regulator 56 is connected in series with first shunt regulator 55 and charge control circuit 51 to generate supply voltages for internal circuits.

Charging circuit 51 is connected to connection point A as well as to connection point D. Charging circuit 51 generates electric currents or voltages for connection point D from part of the electric current flowing into connection point A, and charges electric storage device 53 in the subsequent stage.

Power failure detector 52 is connected to connection points D and N. In addition, power failure detector 52 outputs voltage-monitoring signal PWFL and notifies signal processing circuit 34 of the degree to which electric storage device 53 is charged or discharged.

Electric storage device 53 is also connected to connection points D and N.

RF unit 54 is also connected to connection points D and N, through which electric power is supplied to the block. Signal WKUP from the output of signal processing circuit 34 is input to RF unit 54 and signal COMM is input to and output from the transmitter/receiver block. RF unit 54 is enabled or disabled according to signal WKUP and performs serial communication based, for example, on start-stop synchronization, with signal processing circuit 34, using signal COMM.

Now the behavior of the valve positioner discussed above will be explained according to the embodiment illustrated in FIG. 7.

In the embodiment illustrated in FIG. 7, the electric current that flows through charging circuit 51 and charges electric storage device 53 is consumed by analog-to-digital converter (ADC) 33, signal processing circuit 34, digital-to-analog converter (DAC) 35, and other components.

Consequently, the embodiment illustrated in FIG. 7 is advantageous in that electric storage device 53 can be charged in a stable, efficient manner without being affected by changes in the electric current consumed by ADC 33, signal processing circuit 34, DAC 35, and other components. It should be noted that appropriate voltage level shifting (not shown in the figure) is applied, as necessary, to signals CTRL, PWFL, WKUP, and the COMM using transistors, IC devices and the like.

Another advantage of the embodiment illustrated in FIG. 7 is that a highly efficient, small, low-cost valve positioner is provided as with the embodiment illustrated in FIG. 6. Yet another advantage of the embodiment illustrated in FIG. 7 is that the valve positioner can be conveniently configured using electronic parts and the like that are easily available on the market. Yet another advantage of the embodiment illustrated in FIG. 7 is that the valve positioner can communicate appropriately with an external host system, asset management system, or the like.

Figure 8:
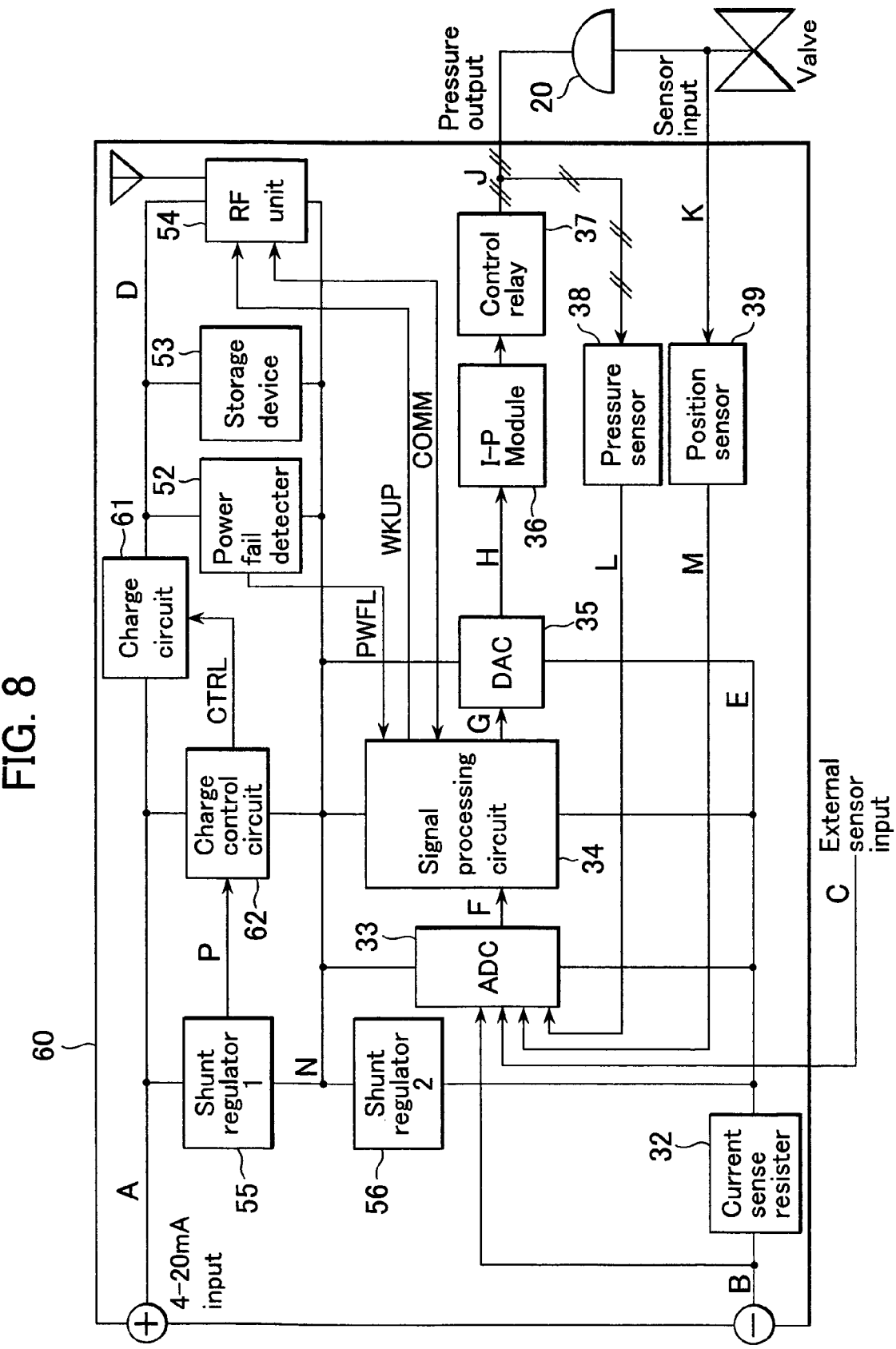
FIG. 8 is a block diagram illustrating a fourth embodiment of the positioner in accordance with the present invention.

The present invention will hereinafter be described in detail with reference to FIG. 8. FIG. 8 is a block diagram illustrating a fourth embodiment of the valve positioner in accordance with the present invention. Note that elements identical to those shown in FIG. 7 are referenced alike and excluded from the explanation.

The embodiment (valve positioner 60) illustrated in FIG. 8 is characteristic in that like the embodiment illustrated in FIG. 7, charging circuit 61 and electric storage device 53 are used to configure the valve positioner. The embodiment illustrated in FIG. 8 is also characteristic in that the valve positioner is equipped with charge control circuit (charge control means) 62 formed using hardware other than signal processing circuit 34.

Charge control circuit 62 is connected to connection points A and N. In addition, signal P from the output of first shunt regulator 55 is input to charge control circuit 62. Symbol P denotes a signal correlated with the electric current that flows through first shunt regulator 55. Charge control circuit 62 controls charging circuit 61 so that the electric current of first shunt regulator 55 is kept above a given level, thereby also controlling the amount of electric current charged into electric storage device 53.

Charging circuit 61 is connected to connection point A, as well as to connection point D. From part of the electric current flowing into connection point A, charging circuit 61 generates an electric current or voltage for connection point D and charges electric storage device 53 in the subsequent stage. In addition, signal CTRL from the output of charge control circuit 62 is input to charging circuit 61.

Now the behavior of the valve positioner discussed above will be explained according to the embodiment illustrated in FIG. 8.

Signal P changes in proportion to the electric current that flows through first shunt regulator 55, causing signal CTRL to also change, and the amount of electric current being charged into electric storage device 53 changes as well. Consequently, second shunt regulator 56 always generates a constant voltage.

Another advantage of the embodiment illustrated in FIG. 8 is that a highly efficient, small, low-cost valve positioner is provided as with the embodiment illustrated in FIG. 6. Yet another advantage of the embodiment illustrated in FIG. 8 is that the valve positioner can be conveniently configured using electronic parts and the like that are easily available on the market. Yet another advantage of the embodiment illustrated in FIG. 8 is that the valve positioner can communicate appropriately with an external host system, asset management system, or the like.

Figure 9:
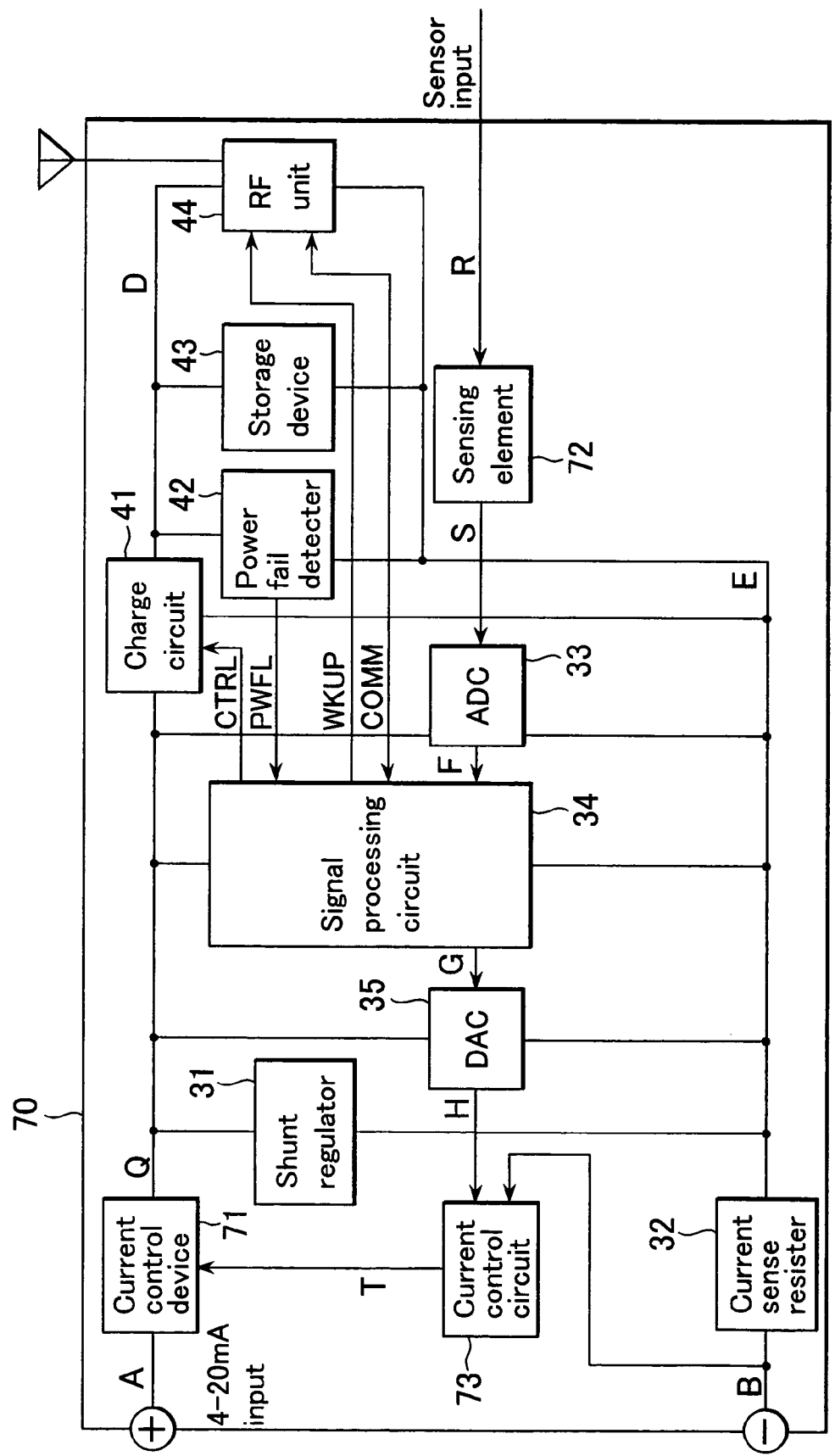
FIG. 9 is a block diagram illustrating a fifth embodiment of the positioner in accordance with the present invention.

The present invention will hereinafter be described in detail with reference to FIG. 9. FIG. 9 is a block diagram illustrating a fifth embodiment of the valve positioner in accordance with the present invention. Note that elements identical to those shown in FIG. 6 are referenced alike and excluded from the explanation.

The embodiment illustrated in FIG. 9 is characteristic in that charging circuit 41 and charging device 43 are used to configure the embodiment. The embodiment illustrated in FIG. 9 represents sensor (field device) 70.

The input end of current control device 71 is connected to connection point A and the output end thereof is connected to connection point Q. Connection point Q is connected to internal circuits, such as shunt regulator 31, analog-to-digital converter (ADC) 33, signal processing circuit 34, and digital-to-analog converter (DAC) 35, through which electric power is supplied to these internal circuits. Connection point Q is also connected to charging circuit 41, to which electric power is supplied.

Physical input signal R, such as pressure, flow rate or temperature, is input to sensing element 72 and the element outputs signal S to ADC 33.

Signal H from the output of DAC 35 is input to one input end of current control circuit 73, and a signal from one end of current-sensing resistor 32 (connection point B) is input to the other input end of current control circuit 73. In addition, signal T from the output of current control circuit 73 is input to the control input of current control device 71.

Now the behavior of the sensor discussed above will be explained according to the embodiment illustrated in FIG. 9. For example, a 24 V DC voltage is supplied between connection points A and B. As with the embodiment illustrated in FIG. 6, shunt regulator 31 generates a prescribed supply voltage between connection points Q and E. Also as with the embodiment illustrated in FIG. 6, charging circuit 41 generates a prescribed electric current or voltage between connection points D and E and charges electric storage device 43.

A physical quantity input to the sensor is converted into a signal by sensing element 72; the signal is converted from an analog value into a digital value by analog-to-digital converter (ADC) 33; the digital value is submitted to appropriate signal processing by signal processing circuit 34; the digital value is converted back to an analog value by digital-to-analog converter (DAC) 35; the analog value is compared with the value of a 4-20 mA current signal by current control circuit 73; the results of the comparison are transferred to current control device 71; and thus the value of the 4-20 mA current signal is controlled.

In this way, the value of the 4-20 mA current signal is set to one corresponding to the physical quantity. An electric current corresponding to the difference between the value of this 4-20 mA current signal (electric current value of the signal line) and the value of electric currents flowing through shunt regulator 31, ADC 33, signal processing circuit 34, DAC 35 and other internal circuits, flows through charging circuit 41.

From part of the electric current (electric current of the signal line) flowing into connection point Q, charging circuit 41 generates an electric current or voltage for connection point D and charges electric storage device 43 in the subsequent stage.

Consequently, as with the embodiment illustrated in FIG. 6, the embodiment illustrated in FIG. 9 provides a highly efficient, small, low-cost sensor. Another advantage of the embodiment illustrated in FIG. 9 is that the sensor can be conveniently configured using electronic parts and the like that are easily available in the market. Yet another advantage of the embodiment illustrated in FIG. 9 is that the sensor can communicate appropriately with an external host system, asset management system, or the like.

Figure 10:
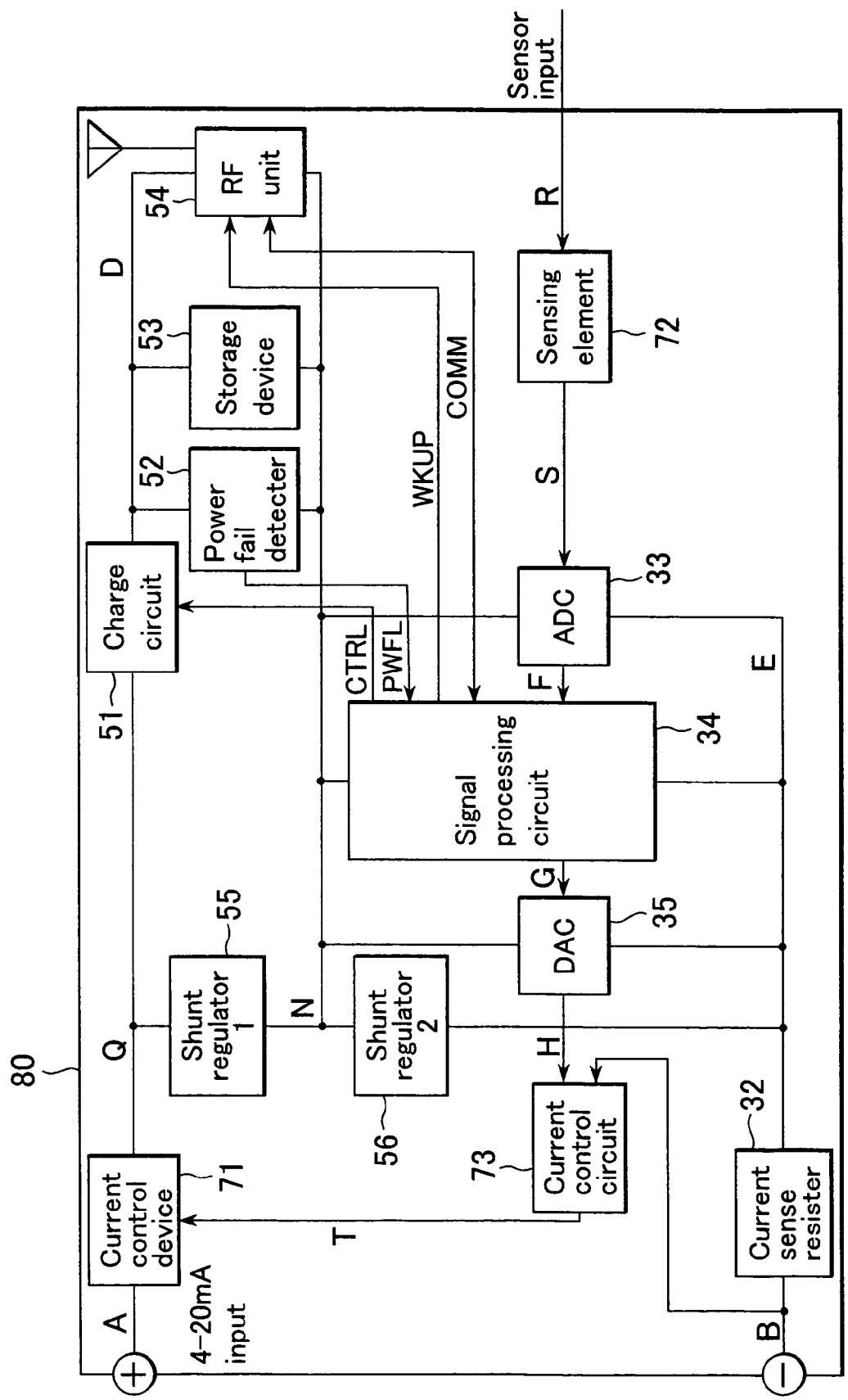
FIG. 10 is a block diagram illustrating a sixth embodiment of the positioner in accordance with the present invention.
Figure 11:
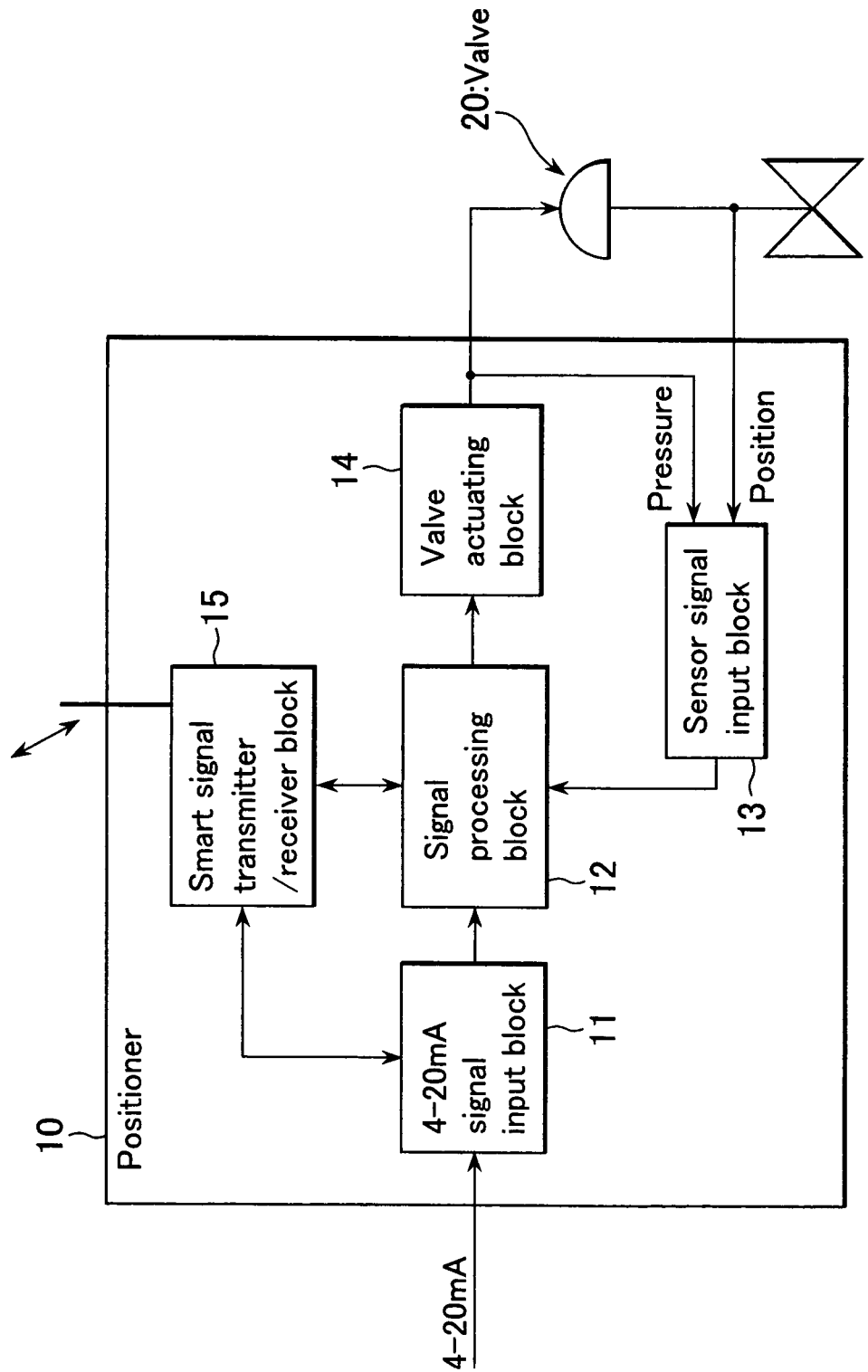
FIG. 11 is a conceptual block diagram illustrating the general, basic configuration of a conventional positioner.

Now an explanation will be made in detail with reference to FIG. 10. FIG. 10 is a block diagram illustrating a sixth embodiment in accordance with the present invention. Note that elements identical to those shown in FIGS. 7 and 9 are referenced alike and excluded from the explanation.

As with the embodiment illustrated in FIG. 7, the embodiment illustrated in FIG. 10 is characteristic in that charging circuit 41 and charging device 43 are used to configure this embodiment and first shunt regulator 55 and second shunt regulator 56 are provided in the embodiment. The embodiment illustrated in FIG. 10 represents sensor (field device) 80.

The configuration discussed above according to the embodiment illustrated in FIG. 10 is virtually the same as that of the embodiment illustrated in FIG. 7.

Consequently, the embodiment illustrated in FIG. 10 is advantageous in that electric storage device 53 can be charged in a stable, efficient manner without being affected by changes in the electric current consumed by ADC 33, signal processing circuit 34, DAC 35, and other components.

Another advantage of the embodiment illustrated in FIG. 10 is that a highly efficient, small, low-cost sensor is provided as with the embodiment illustrated in FIG. 7. Yet another advantage of the embodiment illustrated in FIG. 10 is that the sensor can be conveniently configured using electronic parts and the like that are easily available on the market. Yet another advantage of the embodiment illustrated in FIG. 10 is that the sensor can communicate appropriately with an external host system, asset management system, or the like.

The embodiments described above are those of field devices in which a 4-20 mA signal (analog signal) is input and output. Alternatively, the present invention may be applied to field devices other than discussed above. In this case, the same effects and advantages can be achieved since these devices will result in virtually the same configurations as discussed above.

It is to be understood that the present invention is not restricted to the foregoing embodiments; rather, many other alterations and modifications thereof may be made without departing from the spirit and essential characteristics thereof. It is therefore intended that such alterations and modifications be covered by the appended claims.

What is claimed is:

1. A field device installed in a plant or factory connected to a higher-order distributed control system through a signal line, and configured to receive or transmit analog signals, comprising:
    an RF unit for transmitting or receiving radio signals; and
    a power supply block for accumulating extra electric currents from the signal line when said RF unit is neither transmitting nor receiving radio signals;
    wherein electric power accumulated in said power supply block are supplied to said RF unit so as to be used as electric power for transmitting or receiving radio signals;
    wherein the power supply block is directly connected to the RF unit; and
    wherein said power supply block is configured so as to accumulate extra electric currents received from said 4-20 mA signals in a storage battery or a capacitor.

2. The field device of claim 1, wherein said RF unit is configured to operate so as to minimize the current consumption thereof when neither transmitting nor receiving signals.

3. The field device of claim 1 or 2, wherein said RF unit is configured to be able to exchange data with an asset management system.

4. The field device of claim 3, wherein said asset management System monitors and diagnoses field devices according to information sent therefrom.

5. The field device of claim 1 or 2, wherein said RF unit is configured to be able to exchange data with a handheld data terminal.

6. The field device of claim 1 or 2, wherein said RF unit is configured to be able to exchange data with another field device.

7. The field device of claim 1 or 2, wherein data transmitted from said RF unit is a major process variable, an auxiliary process variable, diagnostic information or device operation information, or a plurality thereof.

8. The field device of claim 1 or 2, wherein said field device is configured so that additional sensor signals can be externally input thereto.

9. The field device of claim 1 or 2, wherein said RF unit has a modular configuration whereby said RF unit can be removed in part or in whole.

10. The field device of claim 1 or 2, wherein said power supply block has a modular configuration whereby said power supply block can be removed in part or in whole.

11. The field device of claim 1 or 2, wherein said field device is a valve positioner.

12. In a field device installed in a plant or factory connected to a higher-order distributed control system through a signal line, configured to receive or transmit 4-20 mA signals, and comprised of an RF unit connected to a signal processing circuit to transmit or receive data using radio signals, a method for transferring signals of said field device wherein data is transmitted wirelessly from said RF unit using part of the frame of a digital communication protocol used for 4-20 mA field devices;
    wherein the part of the frame of a digital communication protocol that is wirelessly transmitted is the command, byte count or data parameters of said frame; and
    wherein said digital communication protocol frame to be transmitted wirelessly is the data link layer frame or application layer frame of said digital communication protocol used for 4-20 mA field devices, or a combination thereof.

13. The signal transfer method of claim 11, wherein logical signals not modulated with a modem are used to physically exchange signals between said signal processing circuit and said RF unit.

14. The signal transfer method of claim 11, wherein said digital communication protocol frame used between said signal processing circuit and said RF unit is the data link layer frame or application layer frame of said digital communication protocol used for 4-20 mA field devices, or a combination thereof.

15. The signal transfer method of claim 11, wherein said digital communication protocol whose upper layers are used, is HART.

* * * * *